United States Patent [19]

Sudo et al.

[11] 4,456,659

[45] Jun. 26, 1984

[54] SUBSTRATE FOR OPTICAL DISC RECORDING MEDIA

[75] Inventors: Ryoichi Sudo, Yokosuka; Hiroaki Miwa; Takeshi Watanabe, both of Yokohama, all of Japan

[73] Assignee: Hitachi, Ltd., Tokyo, Japan

[21] Appl. No.: 469,590

[22] Filed: Feb. 25, 1983

[30] Foreign Application Priority Data

Mar. 10, 1982 [JP] Japan .................................. 57-36372

[51] Int. Cl.³ .......................... B32B 9/04; B32B 13/12
[52] U.S. Cl. ..................................... 428/447; 428/448; 428/451; 428/500; 428/507; 428/515; 428/519; 428/520
[58] Field of Search ............... 428/500, 447, 448, 451, 428/507, 515, 519, 520

[56] References Cited

FOREIGN PATENT DOCUMENTS 52-8856 3/1977 Japan .................................. 428/500
53-86756 7/1978 Japan .................................. 428/500

*Primary Examiner*—Thomas J. Herbert, Jr.
*Attorney, Agent, or Firm*—Antonelli, Terry & Wands

[57] ABSTRACT

This invention relates to a substrate for optical disc recording media which contains a UV-curable resin film between a transparent film and a thermally-decomposing high molecular film, the UV-curable resin film being formed with a UV-curable resin composition comprising given quantities of:
(a) a polybutadiene having acrylic or methacrylic group at one or both ends of the molecule,
(b) a hydroxyalkyl acrylate or methacrylate,
(c) an acrylic- or methacrylic-group-containing diluent, and
(d) a photo-polymerization initiator.

6 Claims, 4 Drawing Figures

SUBSTRATE FOR OPTICAL DISC RECORDING MEDIA

BACKGROUND OF THE INVENTION

This invention relates to a substrate for optical disc recording media which record and reproduce photosignals at a high speed and high density.

DESCRIPTION OF THE PRIOR ART

Figure 1:
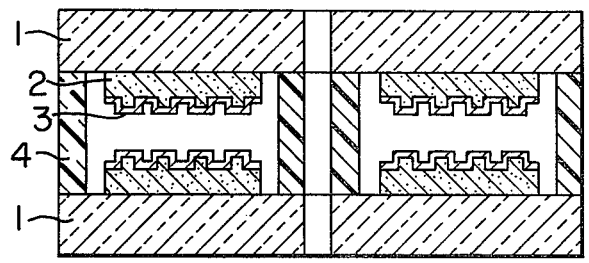

Optical disc recording media, as illustrated in FIG. 1, are produced by (1) forming, on a transparent substrate 1 made of glass, transparent plastic, etc., a sublayer 2 having a surface unevenness of the form of groove or pit for servotrack, etc., (2) forming, on this sublayer 2, a metal film 3 of Bi, In, Te, As, Pb, Sn, etc. for recording purpose, and then (3) letting two of these structures (1+2+3) thus formed face each other at the metal film side and bonding the transparent substrates 1 to a supporting material (not shown in FIG. 1) with a certain distance maintained between the two structures. Information units are produced by irradiating the metal film 3 for recording purpose with light beams and melting/removing the part of the metal film to form portions where the metal film does not exist. In order to perform the melting/removal of the metal film with a low energy, that is, to improve the sensitivity of recording, the surface of the sublayer 2 is made of a material which is decomposed by the heat of light beams and promotes the melting/removal of the metal film for recording purpose.

Figure 2:
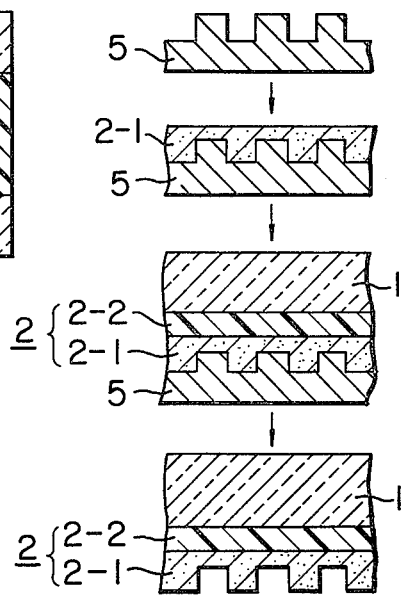

Substrates for such optical disc recording media are produced in accordance with steps shown in FIG. 2. That is, they are produced by (a) coating, on a metal stamper 5 made of nickel, etc. and having a given surface uneven pattern, a thermally decomposing, organic, high molecular weight material composed of nitrocellulose, etc. to form a thermally-decomposing high molecular weight film 2-1, (b) placing, between the film and a transparent substrate 1, a UV (ultra violet light)-curable resin 2-2, (c) UV curing the resin to form a sublayer 2, and then (d) detaching the metal stamper 5.

The above-mentioned UV-curable resin is required to meet the following conditions (i) to (iv).

(i) The UV-curable resin, when UV cured, is optically transparent.

(ii) The resin adheres firmly to the transparent substrate composed of glass, transparent plastic. etc.

(iii) The resin does not dissolve the thermally-decomposing, high molecular weight film of nitrocellulose, etc. Also, it does not infiltrate into the film to hinder the separation of the stamper from the film. Further, when UV cured, it adheres well to the thermally-decomposing, high molecular film.

(iv) The resin, when UV cured, does not generate any substance which will corrode the metal film for recording purpose.

Conventional UV-curable resins, however, only partly meet the above conditions (i) to (iv). [Japanese Patent Publication No. 8856/1977, Japanese Patent Application Kokai (Laid-open) No. 86756/1978]

SUMMARY OF THE INVENTION

The object of this invention is to provide a substrate for optical disc recording media free from the drawbacks of the conventional art, by adopting, as the UV-curable resin film placed between the thermally-decomposing high molecular film and the transparent substrate, a film which (i), is optically transparent, (ii), firmly bonds the transparent substrate and the thermally-decomposing, high molecular weight film, (iii), does not infiltrate into the thermally-decomposing, high molecular weight film to hinder the separation of the stamper from the latter film, and (iv), when UV cured, does not generate any substance which corrodes the recording film.

The above-mentioned object of this invention can be achieved by forming the UV-curable resin film between the thermally-decomposing high molecular film and the transparent substrate with a UV-curable resin composition comprising:

(a) a high molecular weight substance of 500 to 10,000 M.W. having acrylic or methacrylic group at one or both ends of the molecule and also a polybutadiene skeleton within the molecule, (b) at least one compound selected from the compounds represented by the general formulas (1) and (2):

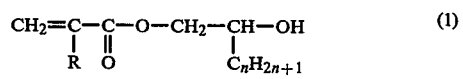

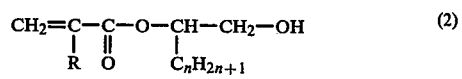

wherein R is H or $CH_3$ and n is an integer of from 2 to 16, (c) a reactive diluent containing at least one acrylic or methacrylic group within the molecule and having a viscosity of 100 mPa.s or lower at 25° C., (a), (b) and (c) being mixed so as to fall within an area formed by connecting the following three points A, B and C in a triangle,

| | The high molecular substance of 500 to 10,000 M.W. mentioned in (a) above, % by weight | At least one compound selected from the compounds represented by the above general formulas (1) and (2), % by weight | The diluent mentioned in (c) above, % by weight |
|---|---|---|---|
| A | 70 | 30 | 0 |
| B | 20 | 80 | 0 |
| C | 20 | 30 | 50 | and, (d) 0.5 to 5 parts by weight of a photo-polymerization initiator based on 100 parts by weight of a mixture of the above components (a), (b) and (c).

Next, further explanations will be made on these components (a), (b), (c) and (d) used in this invention.

The component (a) imparts moisture resistance, toughness and transparency to the UV-curable resin film, and does not dissolve the transparent substrate when the substrate is made of plastic.

Specific examples of the component (a) include a compound of about 1000 or about 2000 M.W. produced by reacting 1 mole of a poly-1,2-butadiene having hydroxyl group at both ends with 2 moles of tolylenediisocyanate and thereafter reacting an excess of isocyanate group with 2 moles of acrylic acid; a compound of about 1000 or about 2000 M.W. produced by reacting 1 mole of a poly-1,2-butadiene having hydroxyl group at both ends with 2 moles of tolylenediisocyanate and thereafter reacting an excess TABLE 2-continued

| Component (a) | Component (b) | Component (b)/[Component (a) + Component (b)], % by weight | | | | | |
|---|---|---|---|---|---|---|---|
| | | 0 | 20 | 40 | 60 | 80 | 100 |
| after reacting an excess of isocyanate group with 2 moles of methacrylic acid. | Equal weight mixture of $CH_2=C-C-O-CH_2-CH-OH$ and $\quad\ \ \ |\ \ \ \|\ \ \ \ \ \ \ \ \ \ \ \ \ \ \ \ \ \ \ \ \ \ |$ $\quad\ \ CH_3\ O\ \ \ \ \ \ \ \ \ \ \ \ \ \ \ \ \ \ CH_3$ $CH_2=C-C-O-CH-CH_2OH$ $\quad\ \ \ |\ \ \ \|\ \ \ \ \ \ |$ $\quad\ \ CH_3\ O\ \ CH_3$ | | Slightly soluble | Soluble | Soluble | Soluble | |
| | Equal weight mixture of $CH_2=C-C-O-CH_2-CH-OH$ and $\quad\ \ \ |\ \ \ \|\ \ \ \ \ \ \ \ \ \ \ \ \ \ \ \ \ \ \ \ \ \ |$ $\quad\ \ CH_3\ O\ \ \ \ \ \ \ \ \ \ \ \ \ \ \ \ \ \ C_2H_5$ $CH_2=C-C-O-CH-CH_2-OH$ $\quad\ \ \ |\ \ \ \|\ \ \ \ \ \ |$ $\quad\ \ CH_3\ O\ \ C_2H_5$ | | Insoluble | Insoluble | Insoluble | Insoluble | Slightly soluble |
| | Equal weight mixture of $CH_2=C-C-O-CH_2-CH-OH$ and $\quad\ \ \ |\ \ \ \|\ \ \ \ \ \ \ \ \ \ \ \ \ \ \ \ \ \ \ \ \ \ |$ $\quad\ \ CH_3\ O\ \ \ \ \ \ \ \ \ \ \ \ \ \ \ \ \ \ C_{16}H_{33}$ $CH_2=C-C-O-CH-CH_2-OH$ $\quad\ \ \ |\ \ \ \|\ \ \ \ \ \ |$ $\quad\ \ CH_3\ O\ \ C_{16}H_{33}$ | | Insoluble | Insoluble | Insoluble | Insoluble | Insoluble |

EXAMPLE 3

There were prepared various compositions each consisting of a commercial poly-1,2-butadiene having methacrylic group at both ends of the molecule (M.W.: about 2000, brand name: TE 2000, manufacturer: Nihon Soda) as the component (a) and an equal weight mixture of 2-ethyl-2-hydroxyethyl methacrylate and 1-ethyl-2-hydroxyethyl methacrylate as the component (b). To each composition prepared above, there were added 2% by weight of benzyl dimethyl ketal as a photo-polymerization initiator, namely the component (d), and 2% by weight of vinyl triethoxy silane as a silane coupling agent.

Figure 4:
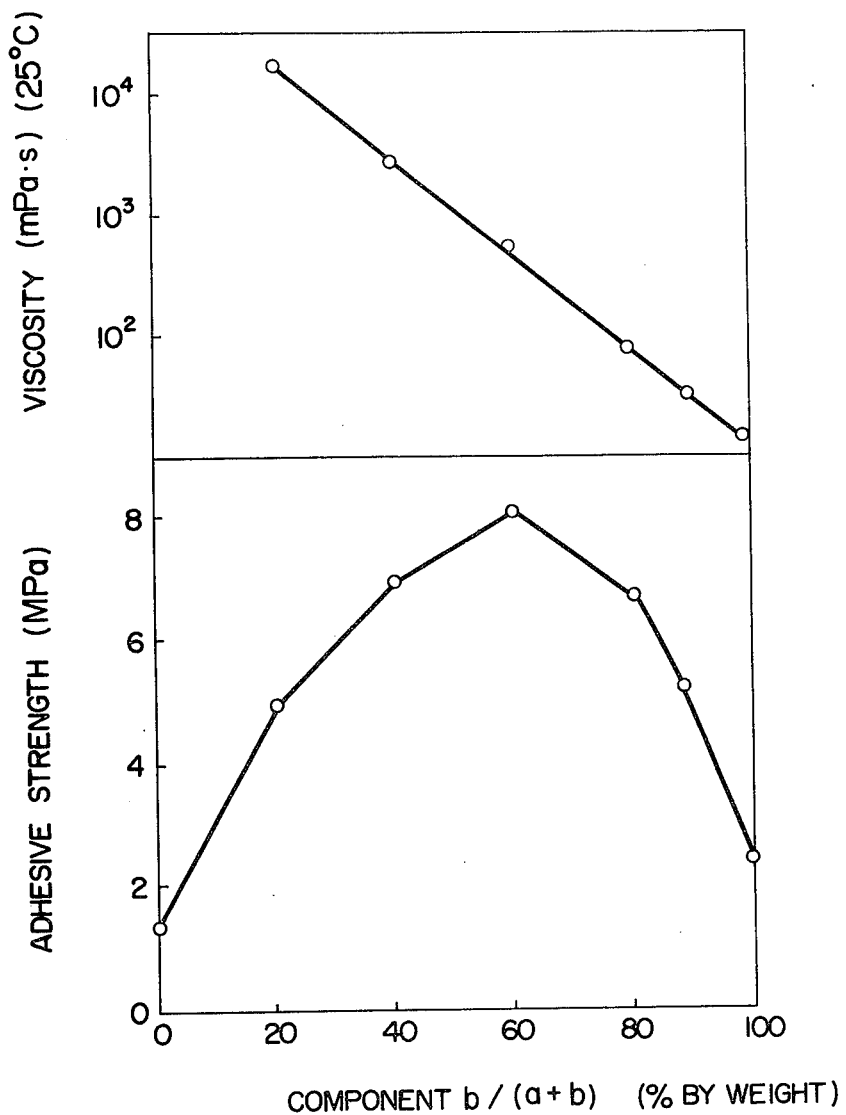

In FIG. 4, there were shown viscosities at 25° C. and adhesive strengths toward a glass plate, of the above-prepared UV-curable resin compositions. The adhesive strengths in FIG. 4 are initial values and these values remained almost same even after standing for 100 hr at 80° C. and 95% RH.

Since good workability is required in production of substrates for optical disc recording media, it is desirable that the above resin compositions have a viscosity of $5 \times 10^3$ mPa.s or lower at 25° C. Also, to guarantee and reliability of produced substrates, it is desirable that the resin compositions have an adhesive strength toward a glass substrate of 6 MPa or higher. The optimum mixing range of the components (a) and (b) satisfying these conditions is 30 to 80% by weight in terms of % by weight of the component (b) based on the mixture of the components (a) and (b).

EXAMPLE 4

In Table 3, there were shown characteristic properties of composition Nos. 1 to 13 as Example and composition Nos. 14 to 18 as Comparative Example. In these compositions, there were used 1-hydroxycyclohexyl phenyl ketone is a photo-polymerization initiator and α-methacryloxypropyl trimethoxy silane as a silane coupling agent.

As obvious from Table 3, composition Nos. 1 to 13 of this Example do not dissolve a nitrocellulose film, have viscosities lower than $5 \times 10^3$ mPa.s at 25° C. and possess adhesive strengths (toward glass plate) greater than 6 MPa, and satisfy the target values. On he other hand, composition Nos. 14 to 18 as Comparative Example do not meet the target values partly or wholly.

Figure 3:
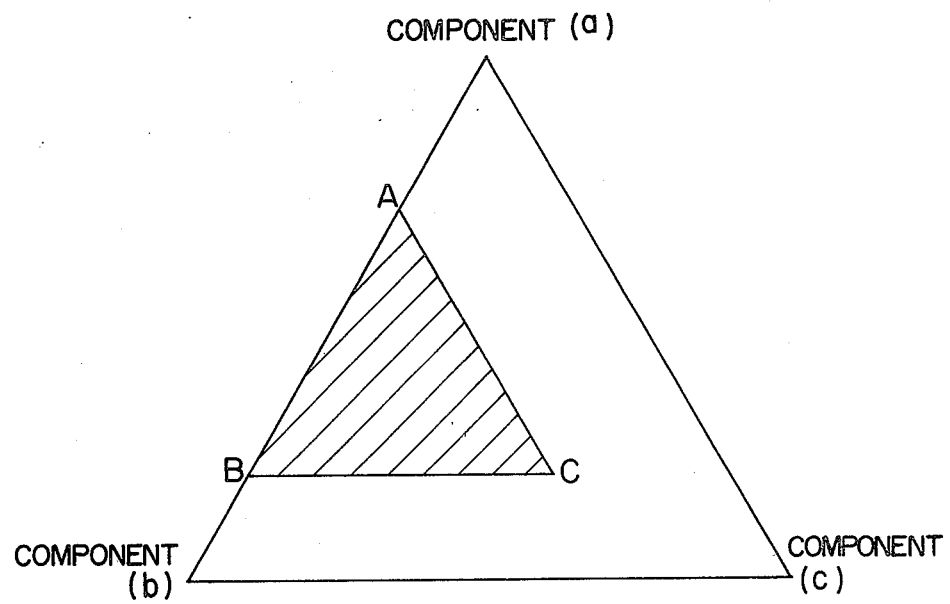

Mixing proportions of the components (a), (b) and (c) in composition Nos. 1 to 13 of this Example are within the composition area formed by the vertexes A, B and C in triangle as shown in FIG. 3.

When the component (a) in the mixture of the components (a), (b) and (c) is less than 20% by weight, as shown in composition No. 15 as Comparative Example, the composition dissolved the nitrocellulose film. When the component (b) in the mixture of the components (a), (b) and (c) is less than 30% by weight, as shown in composition No. 14 as Comparative Example, the composition had an adhesive strength (toward glass plate) lower than 6 MPa (target value).

EXAMPLE 1

As the component (a), there was selected a commercial poly-1,2-butadiene having methacryl group at both ends of the molecule (M.W.: about 2000, brand name: TE 2000, manufacturer: Nihon Soda) produced by reacting 1 mole of a poly-1,2-butadiene having hydroxyl group at both ends of the molecule with 2 moles of tolylenediisocyanate and thereafter reacting an excess of isocyanate group with 2 moles of methacrylic acid. This compound was mixed with equal weight mixtures of two compounds represented by the general formulas (1) and (2) as the component (b) to evaluate their compatibilities. Results were obtained as shown in Table 1.

When n of the general formulas (1) and (2) of the component (b) is equal to or larger than 2, the component (a) and the component (b) are compatible completely and, even if they are allowed to stand in the air to absorb moisture, no turbidity due to partial separation is caused at all. This trend is observed in various mixing proportions of the components (a) and (b). When n of the component (b) is in the range of 2 to 16, mixtures of the components (a) and (b) are extremely stable. Incidentally, to these mixtures of the components (a) and (b) was added 2% by weight of benzoin isopropyl ether as a photo-polymerization initiator of the component (d), and their compatibilities were similar to those in Table 1.

TABLE 1

| Component (a) | Component (b) | Component (b)/[Component (a) + Component (b)], % by weight | | | |
|---|---|---|---|---|---|
| | | 20 | 40 | 60 | 80 |
| Compound produced by reacting 1 mole of a poly-1,2-butadiene having hydroxyl group at both ends of the molecule with 2 moles of tolylenediisocyanate and thereafter reacting an excess of isocyanate group with 2 moles of methacrylic acid | Equal weight mixture of $CH_2=C-C-O-CH_2-CH-OH$ with $CH_3$, $O$, $H$ and $CH_2=C-C-O-CH-CH_2OH$ with $CH_3$, $O$, $H$ | Turbid | Turbid | Phase separation | Phase separation |
| | Equal weight mixture of $CH_2=C-C-O-CH_2-CH-OH$ with $CH_3$, $O$, $CH_3$ and $CH_2=C-C-O-CH-CH_2OH$ with $CH_3$, $O$, $CH_3$ | Turbid | Turbid | Turbid | Turbid |
| | Equal weight mixture of $CH_2=C-C-O-CH_2-CH-OH$ with $CH_3$, $O$, $C_2H_5$ and $CH_2=C-C-O-CH-CH_2OH$ with $CH_3$, $O$, $C_2H_5$ | Compatible | Compatible | Compatible | Compatible |
| | Equal weight mixture of $CH_2=C-C-O-CH_2-CH-OH$ with $CH_3$, $O$, $C_{16}H_{33}$ and $CH_2=C-C-O-CH-CH_2OH$ with $CH_3$, $O$, $C_{16}H_{33}$ | Compatible | Compatible | Compatible | Compatible |

EXAMPLE 2

Nitrocellulose (M.W.: 200,000, nitrogen: 11% by weight) was dissolved in n-butyl acetate to obtain a solution containing 1.5% by weight of the former. This solution was spinner-coated on a nickel stamper and dried. The nitrocellulose film thus formed on the nickel stamper had a thickness of about 2 μm.

Separately, in a manner similar to Example 1, the component (a), the component (b) and mixtures of the components (a) and (b) were prepared as shown in Table 2. They were dropped on the nitrocellulose film prepared above. After 30 min of standing at 25° C., the solubility of the nitrocellulose film was examined. As a result, it was confirmed that, in the range of n of 2 to 16, there is a range of the mixing proportion of the components (a) and (b) wherein nitrocellulose is not dissolved.

TABLE 2

| Component (a) | Component (b) | Component (b)/[Component (a) + Component (b)], % by weight | | | | | |
|---|---|---|---|---|---|---|---|
| | | 0 | 20 | 40 | 60 | 80 | 100 |
| Compound produced by reacting 1 mole of a poly-1,2-butadiene having hydroxyl group at both ends of the molecule with 2 moles of tolylenediisocyanate and there- | Equal weight mixture of $CH_2=C-C-O-CH_2-CH-OH$ with $CH_3$, $O$, $H$ and $CH_2=C-C-O-CH-CH_2-OH$ with $CH_3$, $O$, $H$ | Insoluble | Soluble | Soluble | Soluble | Soluble | Soluble |

TABLE 3

| | Composition No. | Example 4 | | | | | | | | | | | | | | Comparative Example | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| Components, parts by weight | (a) Poly-1,2-butadiene having methacrylic group at both ends (M.W.: about 2000) | 25 | 35 | 55 | 35 | 35 | | | 35 | 35 | 35 | 35 | 35 | 20 | 35 | 10 | | | |
| | Poly-1,2-butadiene having acrylic group at both ends (M.W.: about 1000) | | | | | | 35 | | | | | | | | | | | | |
| | Polybutadiene-acrylonitrile polymer having acrylic group at both ends (M.W.: about 3400, acrylonitrile content: 18% by weight) | | | | | | | 35 | | | | | | | | | | | |
| | (b) Equal weight mixture of 2-ethyl-2-hydroxyethyl methacrylate and 1-ethyl-2-hydroxyethyl methacrylate | 75 | 65 | 45 | | | 65 | 65 | 55 | 55 | 55 | 45 | 30 | 30 | 15 | 45 | | 65 | |
| | Equal weight mixture of 2-n-butyl-2-hydroxyethyl methacrylate and 1-n-butyl-2-hydroxyethyl methacrylate | | | | 65 | | | | | | | | | | | | | | |
| | Equal weight mixture of 2-n-hexyl-2-hydroxyethyl acrylate and 2-n-hexyl-2-hydroxyethylacrylate | | | | | 65 | | | | | | | | | | | 65 | | 65 |
| (c) General monomers | Tridecyl methacrylate | | | | | | | | 10 | | | | | | | | | | |
| | Neopentyl glycol diacrylate | | | | | | | | | 10 | | | | | | | | | |
| | Trimethylolpropane dimethacrylate | | | | | | | | | | 10 | | 35 | 50 | 50 | 45 | | | |
| | 2-Hydroxyethyl methacrylate | | | | | | | | | | | 10 | | | | | | | |
| | Bisphenol A diglycidyl ether diacrylate | | | | | | | | | | | 10 | | | | | 35 | 35 | 35 |
| (d) Other | Photo-polymerization initiator | 2 | 2 | 2 | 2 | 2 | 2 | 2 | 2 | 2 | 2 | 2 | 2 | 2 | 2 | 2 | 2 | 2 | 2 |
| | Silane coupling agent | 2 | 2 | 2 | 2 | 2 | 2 | 2 | 2 | 2 | 2 | 2 | 2 | 2 | 2 | 2 | 2 | 2 | 2 |
| Characteristic properties | Solubility of nitrocellulose in composition | ↓ | ↓ | ↓ | ↓ | ↓ | ↓ | ↓ | Insoluble | Insoluble | ↓ | ↓ | ↓ | ↓ | Insoluble | Soluble | Soluble | Slightly soluble | Components caused phase separation |
| | Viscosity, mPa.s, 25° C. | 130 | 320 | 1800 | 150 | 370 | 250 | 1000 | 230 | 400 | 300 | 350 | 290 | 70 | 280 | 30 | 80 | 100 | |
| | Adhesive strength toward glass, MPa, 25° C. Initial value | 7.0 | 7.7 | 7.2 | 7.5 | 7.0 | 8.0 | 8.1 | 7.8 | 8.0 | 8.0 | 8.0 | 7.9 | 7.9 | 3.0 | 6.0 | 4.0 | 3.0 | |
| | After standing for 100 hr at 80° C. and 95% RH | 6.9 | 7.6 | 7.3 | 7.3 | 6.9 | 7.8 | 8.0 | 7.6 | 7.9 | 7.9 | 7.9 | 7.9 | 7.8 | 2.5 | 5.9 | 2.5 | 2.5 | |

EXAMPLE 5

On a nickel stamper having grooves and pits on the surface, there was coated a nitrocellulose solution in n-butyl acetate and dried to form a nitrocellulose film of about 2 μm in thickness. On this nitrocellulose film, there was dropped each of the UV-curable resin composition Nos. 1 to 18 shown in Table 3. On the resin composition, there was further placed a glass plate of 300 mm in diameter and 1.2 mm in thickness. The laminate thus formed was pressed and thereafter exposed to a high pressure mercury lamp to cure the UV-curable resin. Subsequently, the glass plate and the stamper were pulled to opposite directions in order to separate each other. In the laminates using resin composition Nos. 1 to 13 of Example, separation occured between the stamper and the nitrocellulose film, and on the nitrocellulose surface there was precisely transferred the unevenness pattern which had existed on the surface of the stamper. On the nitrocellulose side surface of the nitrocellulose-adhered glass plate, there was formed a Te-based recording film of about 250 Å in thickness by the vapor deposition method. By letting two same laminates thus formed face each other at the recording film side with a distance of about 1 mm maintained and by bonding the peripheral portions of two glass plates with an epoxy resin type adhesive, a optical disc recording medium was produced. These recording media showed excellent information-recording characteristics and no deterioration at all in a continuous life test of over 1000 hr at 60° C. and 95% RH. On the other hand, in the laminates using resin composition Nos. 14 to 18 of Comparative Example, there adhered to the stamper the nitrocellulose and/or the cured, UV-curable resin in separation of the stamper from the glass plate. Thus desired replicas could not be obtained.

What is claimed is:

1. A substrate for optical disc recording media which comprises a transparent substrate and a sublayer formed thereon, which sublayer comprises a UV-curable resin film and a thermally decomposing high molecular weight film, characterized in that said UV-curable resin film existing between the transparent substrate and the thermally decomposing high molecular weight film of the sublayer is composed of a UV-curable composition comprising:

(a) a high molecular weight substance of 500 to 10,000 M.W. having acrylic or methacrylic group at one or both ends of the molecule and also a polybutadiene skeleton within the molecule,
   (b) at least one compound selected from the compounds represented by the general formulas (1) and (2):

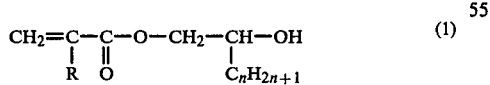

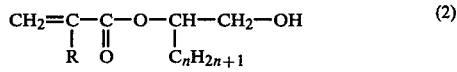

wherein R is H or $CH_3$ and n is an integer of from 2 to 16,
   (c) a reactive diluent containing at least one acrylic or methacrylic group within the molecule and having a viscosity of 100 mPa.s or lower at 25° C., (a), (b) and (c) being mixed so as to fall within an area formed by connecting the following three points A, B and C in a triangle,

| | The high molecular substance of 500 to 10,000 M.W. mentioned in (a) above, % by weight | At least one compound selected from the compounds represented by the above general formulas (1) and (2), % by weight | The diluent mentioned in (c) above, % by weight |
|---|---|---|---|
| A | 70 | 30 | 0 |
| B | 20 | 80 | 0 |
| C | 20 | 30 | 50 | and, (d) 0.5 to 5 parts by weight of a photo-polymerization initiator based on 100 parts by weight of a mixture of the above components (a), (b) and (c).

2. A substrate for optical disc recording media according to claim 1, wherein the high molecular weight substance (a) of 500 to 10,000 M.W. having acrylic or methacrylic group at one or both ends of the molecule and also a polybutadiene skeleton within the molecule is at least one compound selected from the group consisting of a compound produced by reacting 1 mole of a poly-1,2-butadiene having hydroxyl group at both ends with 2 moles of tolylenediisocyanate and thereafter reacting an excess of isocyanate group with 2 moles of acrylic acid; a compound produced by reacting 1 mole of a poly-1,2-butadiene having hydroxyl group at both ends with 2 moles of tolylenediisocyanate and thereafter reacting an excess of isocyanate group with 2 moles of methacrylic acid; and a compound produced by reacting 1 mole of a butadiene-acrylonitrile copolymer having carboxyl group at both ends (acrylonitrile content: 18% by weight) with 2 moles of glycidyl methacrylate.

3. A substrate for optical disc recording media according to claim 1, wherein the compounds represented by the general formula (1) is at least one compound selected from the group consisting of 2-ethyl-2-hydroxyethyl acrylate, 2-ethyl-2-hydroxyethyl methacrylate, 2-n-propyl-2-hydroxyethyl acrylate, 2-n-propyl-2-hydroxyethyl methacrylate, 2-n-butyl-2-hydroxyethyl acrylate, 2-n-butyl-2-hydroxyethyl methacrylate, 2-n-pentyl-2-hydroxyethyl acrylate, 2-n-pentyl-2-hydroxyethyl methacrylate, 2-n-hexyl-2-hydroxyethyl acrylate, 2-n-hexyl-2-hydroxyethyl methacrylate, 2-n-decyl-2-hydroxyethyl acrylate, 2-n-decyl-2-hydroxyethyl methacrylate, 2-n-tetradecyl-2-hydroxyethyl acrylate, 2-n-tetradecyl-2-hydroxyethyl methacrylate, 2-n-hexadecyl-2-hydroxyethyl acrylate and 2-n-hexadecyl-2-hydroxyethyl methacrylate;

the compounds represented by the general formula (2) is at least one compound selected from the group consisting of 1-ethyl-2-hydroxyethyl acrylate, 1-ethyl-2-hydroxyethyl methacrylate, 1-n-propyl-2-hydroxyethyl acrylate, 1-n-propyl-2-hydroxyethyl methacrylate, 1-n-butyl-2-hydroxyethyl acrylate, 1-n-butyl-2-hydroxyethyl methacrylate, 1-n-pentyl-2-hydroxyethyl acrylate, 1-n-pentyl-2-hydroxyethyl methacrylate, 1-n-hexyl-2-hydroxyethyl acrylate, 1-n-hexyl-2-hydroxyethyl methacrylate, 1-n-decyl-2-hydroxyethyl acrylate, 1-n-decyl-2-hydroxyethyl methacrylate, 1-n-tetradecyl-2-hydroxyethyl acrylate, 1-n-tetradecyl-2-hydroxyethyl methacrylate, 1-n-hexadecyl-2-hydroxyethyl acrylate and 1-n-hexadecyl-2-hydroxyethyl methacrylate;

the reactive diluent containing at least one acrylic or methacrylic group within the molecule and having a viscosity of 100 mPa.s or lower at 25° C. is at least one compound selected from the group consisting of lauryl acrylate, lauryl methacrylate, tridecyl methacrylate, isobornyl acrylate, isobornyl methacrylate, neopentyl glycol diacrylate, neopentyl glycol dimethacrylate, trimethylolethane triacrylate, trimethylolethane trimethacrylate, trimethylolpropane triacrylate, trimethylolpropane trimethacrylate, 1,6-hexanediol diacrylate and 1,6-hexanediol dimethacrylate; and the photo-polymerization initiator is at least one compound selected from the group consisting of benzils, benzoins, benzophenones, acetophenones, thioxanethones, anthraquionones and phenylketones.

4. A substrate for optical disc recording media according to claim 1, wherein said thermally decomposing high molecular weight film is made of nitrocellulose.

5. A substrate for optical disc recording media according to claim 1, wherein said UV-curable composition further comprises a silane coupling agent.

6. A substrate for optical disc recording media according to claim 5, wherein said silane coupling agent is at least one compound selected from the group consisting of α-acryloxypropyl trimethoxy silane, α-methacryloxypropyl trimethoxy silane, vinyl trimethoxysilane, and vinyl triethoxy silane.

* * * * *